No. 744,571. PATENTED NOV. 17, 1903.
J. F. LEEPER.
CORN HARVESTER.
APPLICATION FILED APR. 20, 1903.
NO MODEL. 2 SHEETS—SHEET 1.

WITNESSES:
INVENTOR
John F. Leeper
BY
Emil Stark
ATTORNEY

No. 744,571. PATENTED NOV. 17, 1903.
J. F. LEEPER.
CORN HARVESTER.
APPLICATION FILED APR. 20, 1903.
NO MODEL. 2 SHEETS—SHEET 2.

WITNESSES:

INVENTOR
John F. Leeper
BY
Emil Stanek
ATTORNEY

No. 744,571. Patented November 17, 1903.

UNITED STATES PATENT OFFICE.

JOHN F. LEEPER, OF ALTON, ILLINOIS.

CORN-HARVESTER.

SPECIFICATION forming part of Letters Patent No. 744,571, dated November 17, 1903.

Application filed April 20, 1903. Serial No. 153,524. (No model.)

*To all whom it may concern:*

Be it known that I, JOHN F. LEEPER, a citizen of the United States, residing at Alton, in the county of Madison and State of Illinois, have invented certain new and useful Improvements in Corn-Harvesters, of which the following is a full, clear, and exact description, reference being had to the accompanying drawings, forming a part hereof.

My invention has relation to improvements in corn harvesters or cutters; and it consists in the novel arrangement and combination of parts more fully set forth in the specification, and pointed out in the claims.

Figure 1:
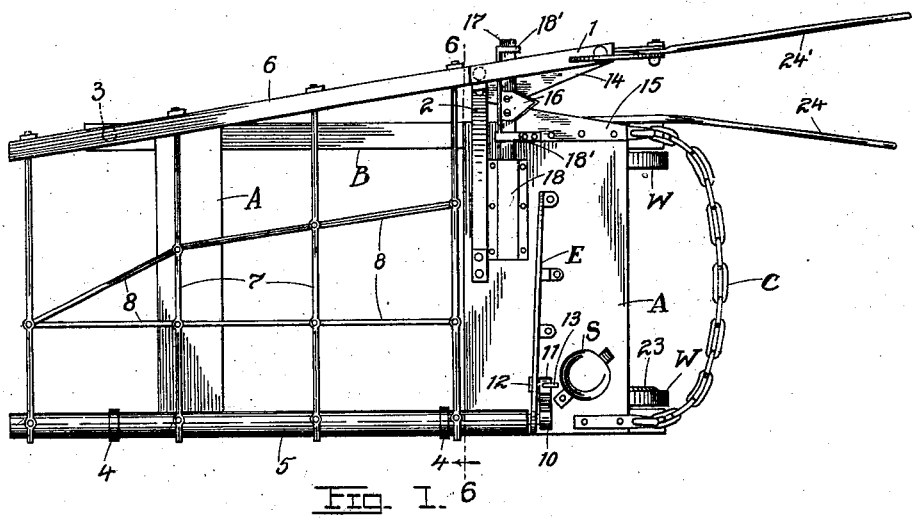
Figure 2:
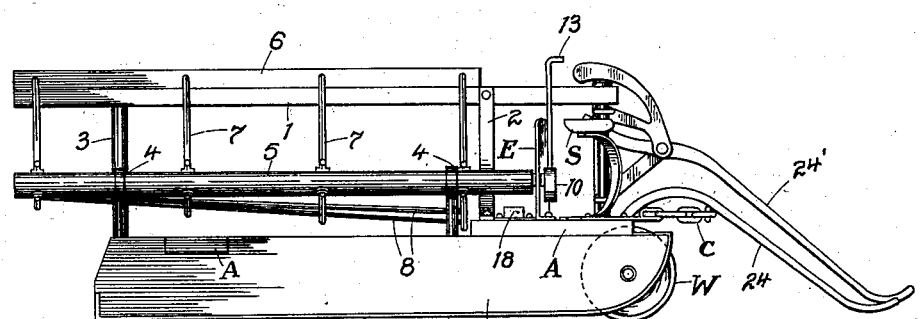
Figure 3:
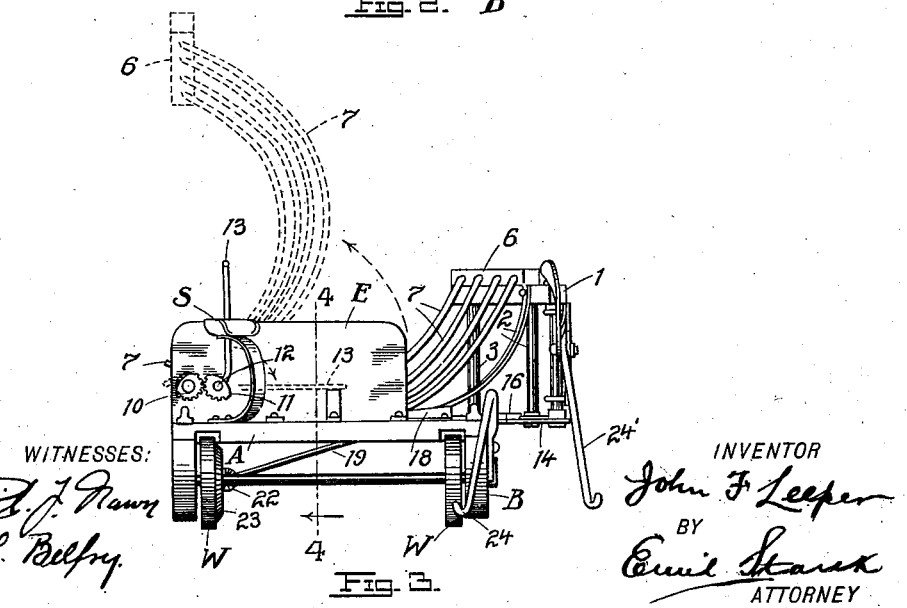
Figure 4:
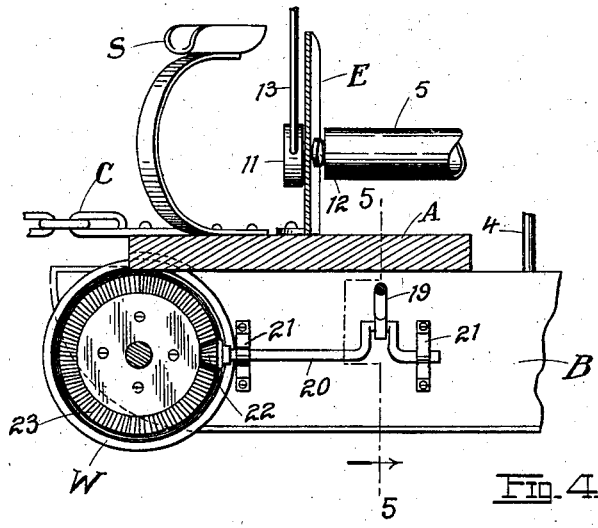
Figure 5:
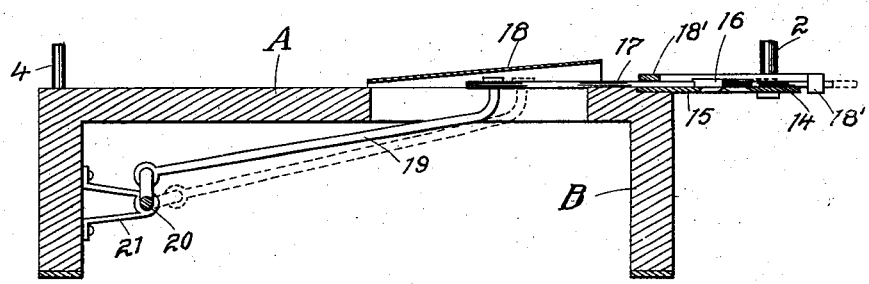
Figure 6:
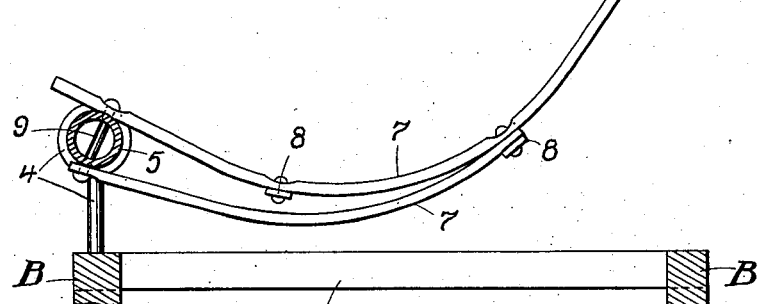

In the drawings, Figure 1 is a top plan view of the machine. Fig. 2 is a side elevation thereof. Fig. 3 is a front elevation, the dotted position showing the position of the cradle when dumping. Fig. 4 is a vertical enlarged sectional detail on line 4 4 of Fig. 3. Fig. 5 is a vertical transverse section on the broken line 5 5 of Fig. 4; and Fig. 6 is an enlarged transverse section of the dumping-cradle, the section being taken on line 6 6 of Fig. 1.

The present machine is an improvement on the harvester shown and described in my United States Letters Patent No. 712,557, dated November 4, 1902, and while possessing the several advantages inherent in the patented construction the present device is materially simplified, is more effective, more conveniently dumped, and positive in action, all as will more fully appear from a detailed description thereof, which is as follows:

Referring to the drawings, A represents a platform mounted on runners B, adapted to be drawn between two adjacent rows of corn. At the forward end the same is provided with a chain C, to which the draft-animals are attached. Disposed along one edge of the platform A and extending a suitable distance above it is a frame composed of an upper member 1, inclined to the longitudinal axis of the harvester and of the bracket 2 and post 3, by which the member 1 is supported. Mounted pivotally in bearings 4 4, disposed along the opposite longitudinal edge of the platform, is a dumping-cradle composed of the tubular member 5, (directly mounted in said bearings,) an opposite inclined member 6, and the connecting-framework of concave bows 7 7, and connecting-bars 8 8, the former being forked at one end to embrace the tubular or rocking member 5, the connection between the forked ends and the walls of the tube being effected by pins 9. The member 6 is adapted to rest directly on the member 1 of the cradle-supporting frame, the cradle in the present instance being concave and converging rearwardly, as in my patent referred to. Like in my patented construction the present machine is provided with a shield E and seat S. The forward end of the rocking member 5 of the cradle terminates in a toothed segment 10, with which meshes a similar segment 11, whose hub rotates about a pin or stud 12, carried by the shield E. To the hub of the segment 11 is secured a lever 13 within easy reach of the driver, who upon depressing or swinging the lever in proper direction will rotate the segment 11 about the stud 12, and thereby actuate the segment 10, thus swinging the cradle about the member 5 as an axis and dumping the contents thereof, as best seen by dotted position of the parts in Fig. 3.

Disposed in one plane are the diverging stationary blades 14 15, the latter being secured directly to the platform A and the former being carried by the forward end of the cradle-supporting frame at the base of the outer end of the bracket 2, which forms part of said frame. Adapted to reciprocate transversely across the stationary blades 14 15 and mounted in a plane directly above said blades is the traveling blade 16. The latter is mounted on a bar 17, which reciprocates transversely to the direction of travel of the harvester, the bar being protected by a casing 18 on top of the platform and guided in bearings 18' 18', as best seen in Figs. 1, 5, the inner end of the bar being pivotally coupled to the adjacent end of a connecting-rod 19, which in turn is actuated from a crank-shaft 20, mounted in brackets 21 at the bottom of the platform. The forward end of the crank-shaft carries a bevel-pinion 22, which meshes with the bevel gear-wheel 23, formed with or carried by one of the front pair of running wheels W, with which the machine is provided. The travel of the wheels W, it is obvious, will impart rotation to the crank-shaft, and the latter will reciprocate the bar 17 and knife or blade 16, carried by it. By having a movable or reciprocating blade the stalks are positively cut even where the blades may have become dull. In this respect the present arrangement is an improvement on the patented construction referred to.

In particulars to which no special allusion has been made in the present description the improved machine does not materially differ from those shown in my former patent. Thus the gathering-hooks 24 24' are substantially the same as the corresponding parts 15 15' of my patent.

I do not of course wish to be limited to the precise details here shown, as they may in a measure be departed from without affecting the nature or spirit of my invention.

Unlike the patented construction referred to, in which the cradle is wholly supported on a special frame, the cradle in the present case is pivotally carried in bearings supported on the platform and only the free end of the cradle is supported on the member 1 of the frame 1 2 3. This arrangement constitutes a material simplification over the patented device.

Having described my invention, what I claim is—

1. In a harvester, a cradle comprising a tubular rocking member, a second member inclined thereto, bows disposed transversely across the cradle and connecting the aforesaid members, said bows being forked at one end and spanning the peripheral walls of the tubular member, and means for rotating said rocking member from the front of the machine, substantially as set forth.

2. In a harvester, a cradle comprising a tubular rocking member, a second member inclined thereto, bows disposed transversely across the cradle and connecting the aforesaid members, longitudinal bars connecting the bows, the latter being forked at one end and spanning the peripheral wall of the tubular member, and pins located within the tubular member and connecting the forked ends of the bows to the tube, substantially as set forth.

In testimony whereof I affix my signature in presence of two witnesses.

JOHN F. LEEPER.

Witnesses:
EMIL STAREK,
G. L. BELFRY.